Figure 1:
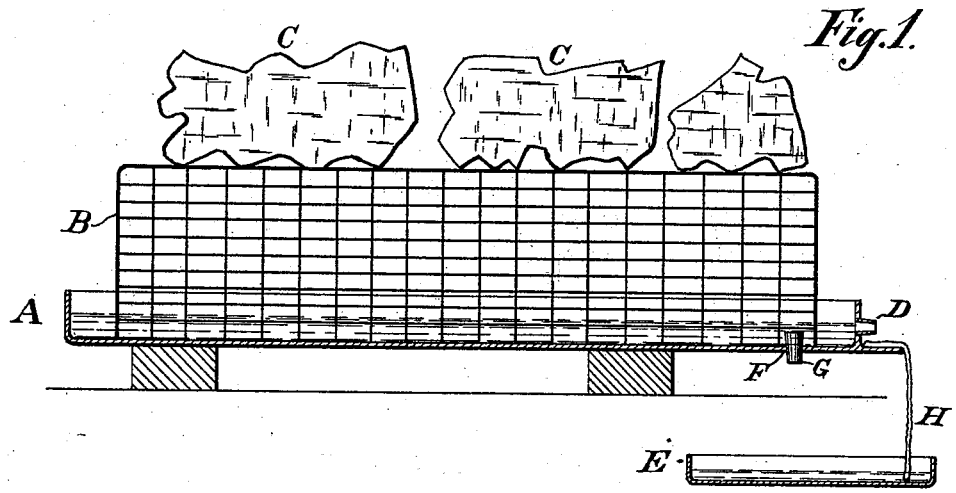
Figure 2:
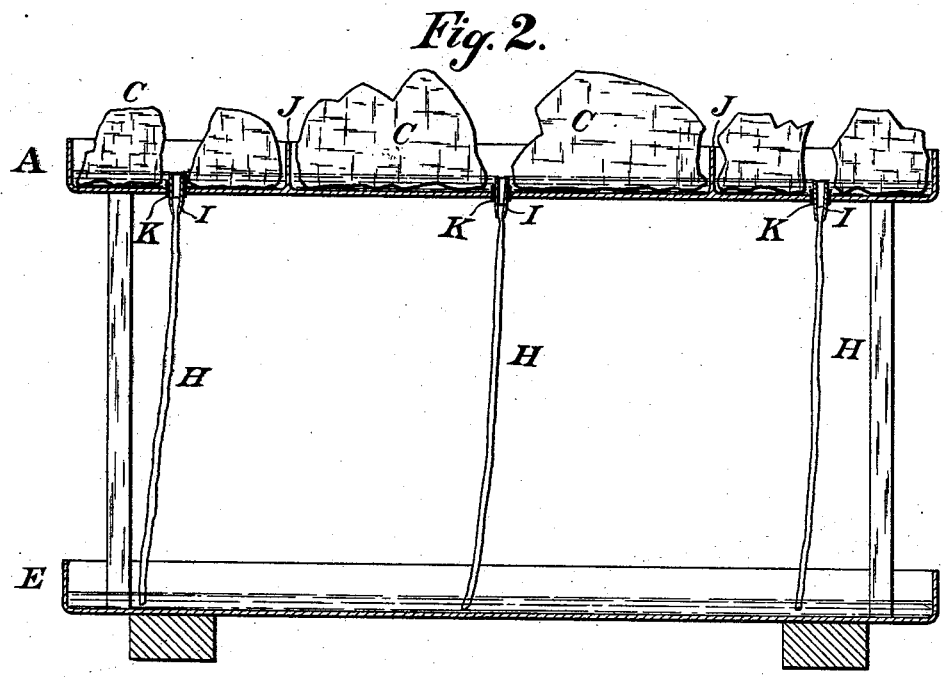

(No Model.)

A. I. DEXTER.
MOISTURE ABSORBING DEVICE.

No. 537,184. Patented Apr. 9, 1895.

Witnesses
M. A. Weinstein
Ella Toebe

Inventor
Avelyn I. Dexter
By Erwin Wheeler & Wheeler
Attorneys

UNITED STATES PATENT OFFICE.

AVELYN I. DEXTER, OF MILWAUKEE, WISCONSIN.

MOISTURE-ABSORBING DEVICE.

SPECIFICATION forming part of Letters Patent No. 537,184, dated April 9, 1895.

Application filed September 4, 1894. Serial No. 522,008. (No model.)

*To all whom it may concern:*

Be it known that I, AVELYN I. DEXTER, a citizen of the United States, residing at Milwaukee, in the county of Milwaukee and State of Wisconsin, have invented new and useful Improvements in Moisture-Absorbing Devices and Processes, of which the following is a specification.

My invention relates to improvements in both the devices for, and processes of, absorbing moisture from the atmosphere in refrigerators, cold storage and similar buildings, where it is desirous to produce a dry, pure atmosphere.

The object of my invention is to increase the rapidity of the action of the absorbent, as well as the amount of the absorption produced by a given quantity of material used.

My invention is further explained by reference to the accompanying drawings, in which—

Figure I. represents a longitudinal section thereof, showing a supporting screen and a fluid distributing strip. Fig. II. represents a modified form, in which the supporting screen is dispensed with.

Like parts are referred to by the same reference letters in both views.

A is a shallow, open tank.

B is an open metallic frame or screen for supporting the absorbent C above and free from contact with the tank A.

D is a discharge duct or opening located a slight distance above the bottom of the tank A, so that the fluid will not escape from the tank until a small quantity has accumulated therein, reaching to the level of the lower side of said duct, when it overflows through said duct and passes down into the tank or duct E, from whence it is withdrawn from the room.

The tank A is provided with an escape opening at F, which is closed with the stopper G. When desirous to draw all the fluid from the tank A, it is permitted to escape by withdrawing the stopper G, when it flows of its own gravity into the tank E. It is obvious that by this arrangement, a large area of the liquid absorbent is exposed to the atmosphere, which greatly increases the effective work accomplished thereby. As an additional means of exposing the liquid absorbent to the atmosphere, a piece of cloth or other fabric H is interposed between the discharge duct D and the tank E, upon which the fluid is discharged, and over and through which it passes as it flows from such discharge duct into the tank E.

The absorbent C is preferably supported, as shown, upon the open screen or frame B, so that the atmosphere of the room will be free to circulate upon all sides of it, whereby the quantity of moisture withdrawn from the atmosphere, in a given length of time, is greatly increased.

In the modified form shown in Fig. II., the fluid is permitted to escape from the tank A through the sleeves I, located in the bottom of the tank, the upper ends of which project slightly above the bottom, so that a small quantity of the fluid will be retained in the tank, reaching the level of the mouth of such sleeve, before overflowing. To cause the absorbent to be equally distributed through the several sleeves I, the tank is subdivided into separate compartments by the partitions J, as otherwise all the liquid would flow through the lowest sleeve. To the discharge ends of the sleeves I, are attached pieces of cloth, wicking or other fabric H, through and over which the absorbent flows to the lower tank E, substantially as shown in Fig. I., thereby increasing the effective work of the absorbent, as previously described, in proportion to the surface exposed to the atmosphere. In this modified form the frame for supporting the absorbent is dispensed with. As an absorbent I preferably use chloride of calcium. This substance when thus exposed in a room, has a tendency to accumulate the moisture therein upon its surface, when the moisture thus accumulated gradually dissolves the chloride, when the chloride and moisture commingle together and flow of their own gravity into the shallow open tank below. The solution thus continues to absorb the moisture of the atmosphere so long as it is retained in the room, and the moisture absorbed is in proportion to the area of the surface exposed. When this solution rises to the mouth of the discharge openings in the tank A, as stated, it overflows, as described, into the tank E and the exposed surface is additionally increased in said tank, when it is finally permitted to pass from the room. The liquid is maintained at any desired height in the modified form of the tank A, by the sleeves I, which are supported in a packing ring or collar K. When desirous to empty the tank A in the modified form, the sleeves I are withdrawn and the fluid permitted to flow therefrom through the supporting aperture.

The novelty of my process consists in first, supporting the chloride of calcium in its solid form, so that, all sides are exposed to the atmosphere, and permitting the solution formed by the accumulated moisture and absorbent to drain into a receiver; in exposing the collected solution to the atmosphere over a large area of surface; and in again collecting the fluid and removing the same from the room.

What I claim as new, and desire to secure by Letters Patent, is—

1. In a moisture absorbing device, the combination of an open shallow fluid retaining tank, a supporting screen located above said fluid retaining tank, chloride of calcium in its solid form supported on said screen, free from contact with the fluid in said tank, a second shallow fluid retaining receiver located below said shallow tank, and a fluid duct leading from said tank at a point above its bottom to said receiver, said fluid tank and receiver being adapted respectively to retain a quantity of the liquid salts therein, exposed to the atmosphere below the mouth of their respective discharge ducts, substantially as described.

2. A moisture absorbing device, consisting of the combination of an open shallow tank; a screen supported above said tank; an absorbent resting on said screen; one or more outlet ducts leading from said tank; and distributing strips of cloth or other fabric adapted to convey the liquid escaping through said outlet ducts to a discharge duct or receiver, substantially as described.

3. A moisture absorbing device, consisting of the combination of an absorbent with an open shallow tank, adapted to receive the liquid collected by the absorbent and provided with an opening or openings for the escape of a portion thereof; a distributing strip or strips formed of cloth or similar material adapted to receive the liquid escaping through said openings, and convey the same slowly through the fabric; and a discharge receiver or duct adapted to receive the collected liquid from the lower end of said strips, substantially as described.

In testimony whereof I affix my signature in the presence of two witnesses.

AVELYN I. DEXTER.

Witnesses:
JAS. B. ERWIN,
LEVERE H. C. WHEELER.